US009893820B2

(12) United States Patent
Nardozza

(10) Patent No.: US 9,893,820 B2
(45) Date of Patent: Feb. 13, 2018

(54) ANTENNA ELEMENT SELF-TEST AND MONITORING

(71) Applicant: Blue Danube Systems, Inc., Warren, NJ (US)

(72) Inventor: Gregg S. Nardozza, Madison, NJ (US)

(73) Assignee: BLUE DANUBE SYSTEMS, INC., Warren, NJ (US)

( * ) Notice: Subject to any disclaimer, the term of this patent is extended or adjusted under 35 U.S.C. 154(b) by 0 days.

(21) Appl. No.: 15/493,294

(22) Filed: Apr. 21, 2017

(65) Prior Publication Data

US 2017/0310403 A1  Oct. 26, 2017

Related U.S. Application Data

(60) Provisional application No. 62/326,099, filed on Apr. 22, 2016.

(51) Int. Cl.

| H04M 1/00 | (2006.01) |
|---|---|
| H04B 17/12 | (2015.01) |
| H01Q 21/22 | (2006.01) |
| H04B 17/13 | (2015.01) |
| H04B 17/14 | (2015.01) |
| H01Q 9/04 | (2006.01) |
| H01Q 11/20 | (2006.01) |
| H04B 17/19 | (2015.01) |
| H04B 7/06 | (2006.01) |

(52) U.S. Cl.
CPC ......... *H04B 17/12* (2015.01); *H01Q 9/0478* (2013.01); *H01Q 11/20* (2013.01); *H01Q 21/22* (2013.01); *H04B 7/0608* (2013.01); *H04B 17/13* (2015.01); *H04B 17/14* (2015.01); *H04B 17/19* (2015.01)

(58) Field of Classification Search
CPC ........ H04B 17/12; H04B 17/13; H04B 17/14; H04B 17/19; H04B 7/0608; H01Q 9/0478; H01Q 11/02; H01Q 21/08; H01Q 21/22; H01Q 21/067; H01Q 3/267; H01Q 1/50; H04W 4/00; H04W 4/025
See application file for complete search history.

(56) References Cited

U.S. PATENT DOCUMENTS

| 5,038,146 A | 8/1991 | Troychak et al. |
|---|---|---|
| 5,471,146 A | 11/1995 | Krayeski et al. |
| 5,867,123 A | 2/1999 | Geyh et al. |
| 8,199,048 B1 * | 6/2012 | Medina Sanchez ... H01Q 21/08 342/174 |

(Continued)

OTHER PUBLICATIONS

U.S. Appl. No. 15/259,639, filed Sep. 8, 2016, Banu et al.

*Primary Examiner* — Thanh Le
(74) *Attorney, Agent, or Firm* — Occhiuti & Rohlicek LLP

(57) ABSTRACT

A method of testing a phased array antenna that includes a plurality of antenna element pairs, each antenna element pair of the plurality of antenna element pairs including a first antenna element and a second antenna element, the method including: for each antenna element pair of the plurality of antenna element pairs, performing a first cross element gain measurement from the first antenna element to the second antenna element of that antenna element pair; and determining whether there is a problem associated with the phased array antenna by examining the first cross element gain measurements for the plurality of antenna element pairs.

17 Claims, 8 Drawing Sheets

(56) References Cited

U.S. PATENT DOCUMENTS

| | | |
|---|---|---|
| 8,259,884 B2 | 9/2012 | Banu et al. |
| 8,611,959 B2 | 12/2013 | Banu et al. |
| 2005/0157683 A1* | 7/2005 | Ylitalo ................. H04B 7/0652 370/334 |
| 2014/0210683 A1* | 7/2014 | Aryanfar ................ H04B 17/13 343/850 |
| 2014/0320344 A1* | 10/2014 | Sanderovich ........ H01Q 21/067 342/372 |
| 2016/0043465 A1* | 2/2016 | McDevitt ............... H01Q 3/267 342/368 |

* cited by examiner

ANTENNA ELEMENT SELF-TEST AND MONITORING

CROSS REFERENCE TO RELATED APPLICATION

This application claims the benefit of U.S. Provisional Application No. 62/326,099, entitled "Antenna Element Self-Test and Monitoring," filed Apr. 22, 2016, all of which is incorporated herein by reference.

TECHNICAL FIELD

Embodiments of the present invention generally relate to testing active phased array antenna systems, and more specifically, to testing antenna elements in phased array antenna systems.

BACKGROUND

In a phased array antenna system, the array is typically a matrix of antenna elements where each element is connected to an individual transceiver. The transceivers are assembled and tested individually, as are the antenna elements. When the two are joined together after individual testing, there is a chance that one of the connections can bend, break, or present a poor RF connection for other reasons, such as poor soldering. Once the transceivers are joined with the antenna element array, discovering problems of this type can be difficult.

A typical antenna array system verification test requires the use of an array test-hat or some sort of near-field sensor. Each element is activated and verified with a field sensor measurement. There are several disadvantages to using such a test-hat or sensor device, including, among others: the need for a bulky, external measuring device of limited portability; requiring an external power source; maintaining calibration of the sensing device; controlling the external RF environment; and the lack of equipment self-test.

SUMMARY

In general, in one aspect, the invention features a method of testing a phased array antenna that includes a plurality of antenna element pairs, each antenna element pair of the plurality of antenna element pairs including a first antenna element and a second antenna element. The method includes: for each antenna element pair of the plurality of antenna element pairs, performing a first cross element gain measurement from the first antenna element to the second antenna element of that antenna element pair; and determining whether there is a problem associated with the phased array antenna by examining the first cross element gain measurements for the plurality of antenna element pairs.

Other embodiments include one or more of the following features. The method also includes: for each antenna element pair of the plurality of antenna element pairs, performing a second cross element gain measurement from the second antenna element to the first antenna element of that antenna element pair, wherein determining whether there is a problem associated with the phased array antenna also involves examining the second cross element gain measurements for the plurality of antenna element pairs. Determining whether there is a problem associated with the phased array antenna also involves, for each antenna element pair among the plurality of antenna element pairs, comparing the first and second cross element gain measurements for that antenna element pair. The method also includes: for each antenna element pair of the plurality of antenna element pairs, performing a first return loss measurement for the first antenna element of that antenna element pair and performing a second return loss measurement for the second antenna element of that antenna element pair, wherein determining whether there is a problem associated with the phased array antenna also involves examining the first and second return loss measurements for the plurality of antenna element pairs. For each antenna element pair of the plurality of antenna element pairs, performing the first cross element gain measurement from the first antenna element to the second antenna element of that antenna element pair comprises measuring the power of a signal sent to the first antenna element of that antenna element pair and measuring the power received by the second antenna element of that antenna element pair. Within each antenna element pair among the plurality of antenna element pairs the first and second antenna elements of that pair are orthogonally oriented with respect to each other, e.g. each antenna element pair is a cross-polarized($\pm 45°$) pair or an H—V polarized pair.

In general, in another aspect, the invention features an apparatus system including: a phased array antenna comprising an array of antenna elements, the array of antenna elements forming a plurality of antenna element pairs, each antenna element pair of the plurality of antenna element pairs including a first antenna element and a second antenna element; a plurality of transmitter circuits, each transmitter circuits of the plurality of transmitter circuits connected to a different corresponding one of the antenna elements within the array of antenna elements; for each transmitter circuit among the plurality of transmitter circuits, a bidirectional coupler connected between that transmitter circuit and the antenna element to which that transmitter circuit is connected; a detector system for measuring a signal characteristic; a switching system for selectively connecting signals from the bidirectional couplers for the plurality of transmitter circuits to the detector system; and a processor system. The processor system is programmed to use the switching system and the detector system to perform the operations of: for each antenna element pair of the plurality of antenna element pairs, performing a first cross element gain measurement from the first antenna element to the second antenna element of that antenna element pair; and determining whether there is a problem associated with the phased array antenna by examining the first cross element gain measurements for the plurality of antenna element pairs.

Other embodiments include one or more of the following features. The processor system is further programmed to use the switching system and the detector system to perform the operations of: for each antenna element pair of the plurality of antenna element pairs, performing a second cross element gain measurement from the second antenna element to the first antenna element of that antenna element pair; and to determine whether there is a problem associated with the phased array antenna by also examining the second cross element gain measurements for the plurality of antenna element pairs. The processor system is further programmed to determine whether there is a problem associated with the phased array antenna by also, for each antenna element pair among the plurality of antenna element pairs, comparing the first and second cross element gain measurements for that antenna element pair. The processor system is further programmed to use the switching system and the detector system to perform the operations of: for each antenna element pair of the plurality of antenna element pairs, performing a first return loss measurement for the first antenna element of that antenna element pair and performing a second return loss measurement for the second antenna element of that antenna element pair, and to determine whether there is a problem associated with the phased array antenna also involves examining the first and second return loss measurements for the plurality of antenna element pairs. Within each antenna element pair among the plurality of antenna element pairs, the first and second antenna elements of that pair are orthogonally oriented with respect to each other, e.g. each antenna element pair is a cross-polarized) (±45°) pair or an H—V polarized pair.

Still other embodiments include one or more of the following features. The apparatus further includes: an RF pilot signal source; for each transmitter circuit among the plurality of transmitter circuits, a directional coupler connected to supply a signal to that transmitter circuit; and a second switching system for selectively connecting signals from the RF pilot signal source to the directional couplers for the plurality of transmitter circuits, and wherein the processor system is further programmed to also use the RF pilot signal source and the second switching system to perform the operations of: for each antenna element pair of the plurality of antenna element pairs, performing the first cross element gain measurement from the first antenna element to the second antenna element of that antenna element pair and performing the second cross element gain measurement from the second antenna element to the first antenna element of that antenna element pair. The processor system is further programmed to also use the RF pilot signal source and the second switching system to perform the operations of: for each antenna element pair of the plurality of antenna element pairs, performing the first return loss measurement for the first antenna element of that antenna element pair and performing a second return loss measurement for the second antenna element of that antenna element pair.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

In the preceding figures, like elements may be identified with like reference numbers.

DETAILED DESCRIPTION

Figure 1:
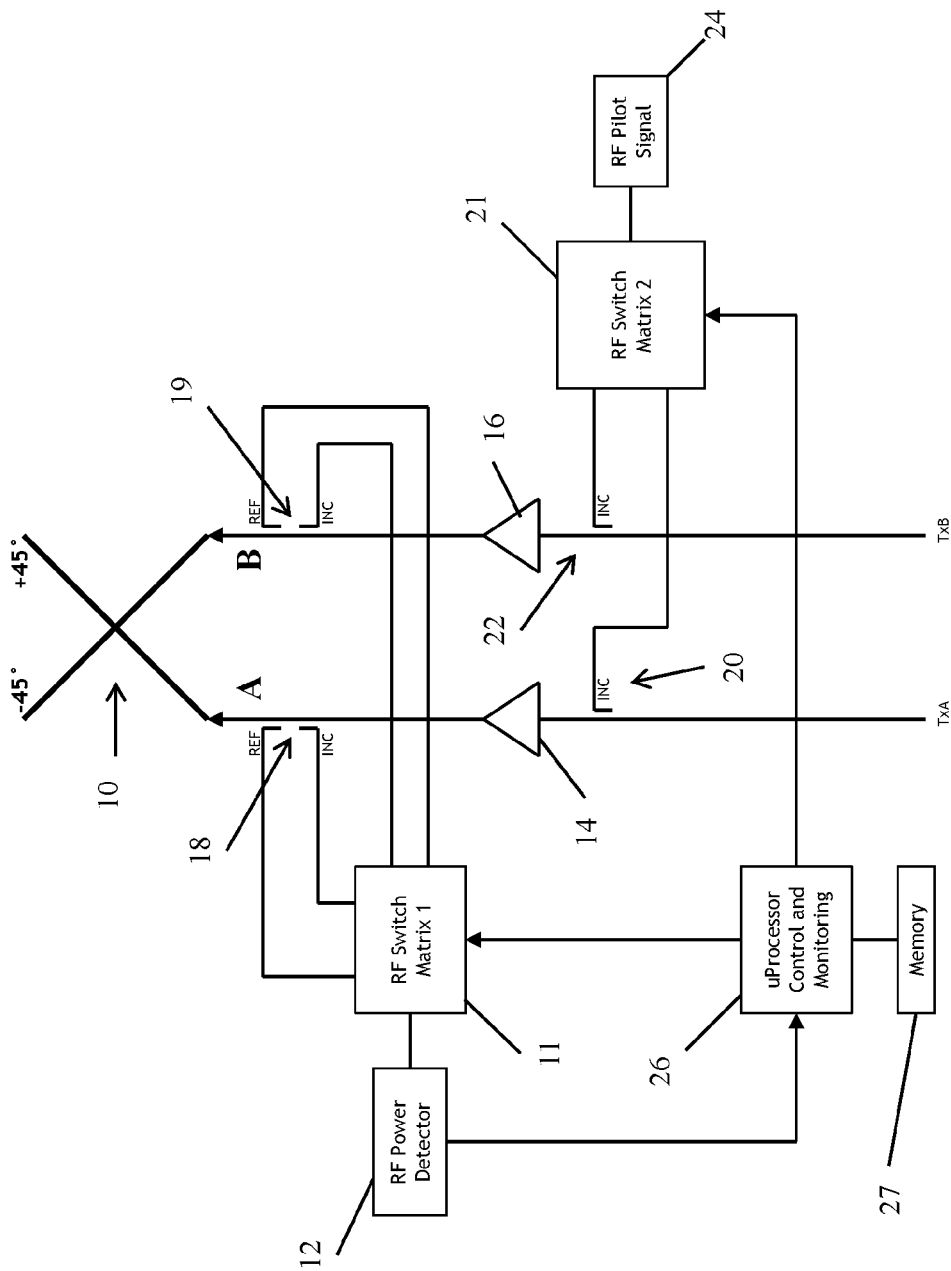
FIG. 1 shows the circuitry for performing return loss and cross element gain measurements on a crossed-polarized antenna element pair within a phased array antenna.

Described below are two internal measuring methods for determining whether each array element is properly connected to the respective transceiver. Each array element typically consists of two orthogonally polarized radiating elements, typically 90 degrees apart from each other, as in a cross-polarized (x-pol) or horizontal-vertical polarized (HV-pol) element. Each pair of orthogonally polarized elements is self-tested by performing a return loss measurement on each individual radiating element and by performing a cross element gain measurement in each direction.

In general, to perform a return loss measurement, a signal is transmitted to a radiating element. Part of that signal is reflected back toward the transmitter based on the return loss or VSWR (Voltage Standing Wave Ratio) of the radiating element. (Note that a VSWR measurement is a form of return loss measurement as both are based on measuring reflected power.) With the use of a dual-directional coupler placed at the input to the radiating element, both the transmitted and reflected signals are measured and compared. If the reflected power is too large, then that indicates that either the connection between the transceiver and the radiating element is damaged (e.g., improperly mated connection) or the radiating element is damaged. This test is repeated on the orthogonal radiating element to insure proper return loss.

To perform the cross element gain measurement, a signal is transmitted to a radiating element and the signal appearing at the orthogonal element is measured via the reflected port of the same dual directional coupler used in making the return loss measurement. The measurement is repeated in the opposite direction. The two measurements are then compared and should be equal and within an expected range. This test insures that the isolation between both orthogonal radiating elements and the gain from each transceiver through to the other is within range. Improper gain or imbalance can indicate a problem with the radiating elements or mating connections that perhaps were not indicated in the return loss test.

These measurements can be used not only to sense the health of the array elements but also to sense an improper installation due to the existence or addition of nearby reflectors.

Also, note that the transmitted test signal used for each test can be implemented in different ways, such as a CW (Continuous Wave) tone, a spread spectrum P-N (Pseudo-Random) signal, or by measuring and monitoring in real-time using the signal being transmitted during normal operation.

These tests are performed for each pair of radiating elements in the array. For example, an array may have 48 x-pol elements. Verification of a properly operating array would thus involve performing the tests described above individually on each of the 48 element pairs.

The advantage of this type of testing is that it can be performed in the lab, in the factory, or in field service, without the need for an external RF test hat or sensing apparatus. These tests can also be used to indicate the presence or sudden installation of a large reflector at a particular site, such as a nearby metal structure which could potentially inhibit proper cell operation.

FIG. 1 shows one implementation of a system that is capable of performing both the return loss and cross gain element test. It should be understood that this is just one example of a number of different ways in which this can be implemented.

The described embodiment includes a cross-pole antenna arrangement 10, each element of which is electrically connected to a corresponding transceiver, of which corresponding transmit power amplifiers 14 and 16 are shown. Besides a transmit power amplifier for amplifying the transmit signal, the transceiver also includes, among other components, a linear amplifier for amplifying the received signal, and a duplexer or switch between the amplifiers and the antenna element (refer to FIGS. 5-7 for details). In the electrical path connecting the transceiver to its corresponding antenna element, there is a bidirectional coupler (e.g. two individual unidirectional couplers arranged back-to-back or an integrated unit that includes the back-to-back directional couplers as a single unit) 18 and 19 with incident ports for sampling in one direction the transmit signal sent to the antenna element and with reflected ports for sampling in the other direction the received or reflected signal coming from the antenna element. The couplers 18 and 19 are typically placed right at or very close to the antenna element connector in order to read the return loss of the element alone, with nothing else in between, for the most accurate measurement. In the case of a return loss measurement, placing the coupler further down the transmitter chain make the return loss estimation of the element less accurate.

On the input side of each transmitter amplifiers 14 and 16, there are corresponding unidirectional couplers 20 and 22 with incident ports for injecting a test signal for transmission through the power amplifier to the corresponding antenna element. There is also an RF pilot signal source 24 for generating a test signal that is injected into the signal path and an RF power detector or monitor 12 for measuring the strength of the signal samples by the directional couplers. An RF switch matrix 11 selectively couples the directional couplers 18 and 19 to the RF power detector 12 and another RF switch matrix 21 selectively couples the RF pilot signal source 114 to the directional couplers 20 and 22. A μProcessor 26, which could be the μProcessor that controls the operation of the phased array or could be a separate μProcessor, controls the RF switch matrices 11 and 21, and is also used to monitor the test measurements and store them in a local memory 27.

To perform the return loss measurement on transmit path A (the left path in FIG. 1), the μProcessor 26 causes the RF switch matrix 21 to connect the RF pilot signal to the incident port of the input directional coupler 20 in transmit path A. The μProcessor 26 also causes RF switch matrix 11 to connect the RF power detector 12 to the incident port of the output directional coupler 18 in transmit path A and stores the value measured by RF power detector 12 in the memory 27. The μProcessor 26 then causes the RF switch matrix 11 to switch the RF power detector 12 to the reflected port of the output directional coupler 18 in transmit path A and store the value measured by the RF power detector 12. The difference between the two measured values represents the return loss of the corresponding antenna element.

The same is done for transmit path B which connects to the other antenna element (on the right side). The return loss measurements are then compared to the expected return loss range for a properly connected and functioning element to determine whether there is a problem.

To perform the cross element gain measurement from transmit path A to transmit path B, the μProcessor 26 causes the RF matrix switch 21 to connect the RF pilot signal source 24 to the incident port of the input directional coupler 20 in transmit path A. The μProcessor 26 also causes RF switch matrix 11 to connect the RF power detector 12 to the reflected port of the output directional coupler 19 in transmit path B and store the value measured by the RF power detector 12 in the memory 27. To perform the cross element gain measurement from transmit path B to transmit path A, the μProcessor 26 causes the RF matrix switch 21 to connect the RF pilot signal source 24 to the incident port of the input directional coupler 22 in transmit path B. The μProcessor 26 also causes the RF switch matrix 11 to connect the RF power detector 102 to the reflected port of the output directional coupler 18 in transmit path A and store the value measured by the RF power detector 12 in the memory 27. The absolute levels and the difference between these two measured values are used to determine whether the cross element gain is balanced and within the expected tolerance.

Figure 2:
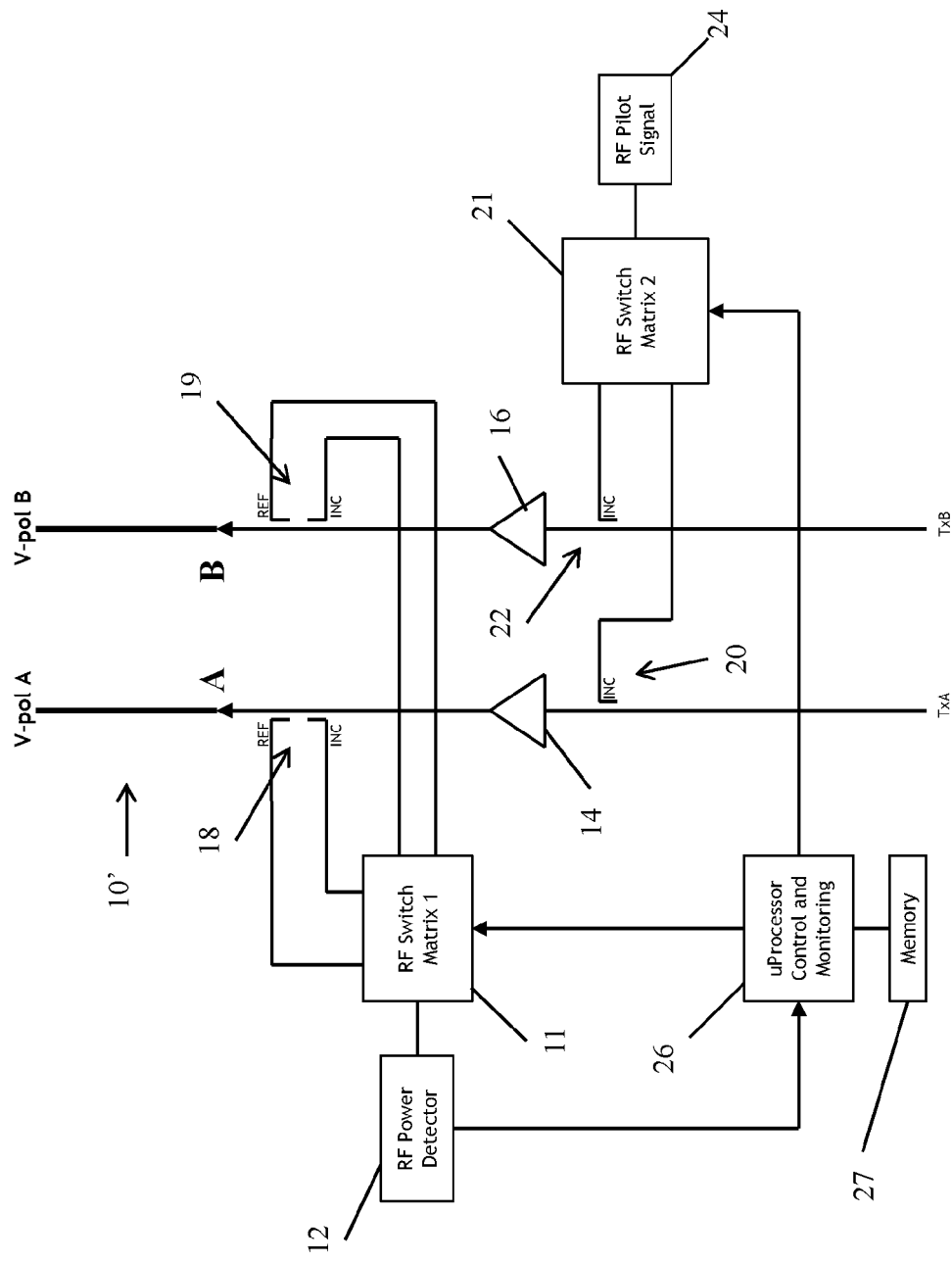
FIG. 2 shows the circuitry for performing return loss and cross element gain measurements on two neighboring antenna elements in a phased array of vertically polarized antenna elements.

This method will also work for a single element array, such as an array of vertically-polarized (V-pol) antenna elements. If there is a planar array of vertically polarized elements, a return loss measurement is performed on each of the V-pol elements, and a cross element gain test is performed between each pair of either horizontally or vertically located elements. A representative system, which is shown in FIG. 2, includes an antenna element pair 10'. The components correspond to the like-numbered components shown in FIG. 1 and perform similar or the same functions.

In an antenna array including elements such as those represented by FIG. 2, there is likely to be no predefined grouping such as there is in the case of the antenna array that employs cross-polarized antenna element pairs. In that case, the antenna elements are paired in the manner that makes the most sense and may involve, for example, picking a nearest neighbor e.g. either in the vertical direction or the horizontal direction. The pairing is defined in such a way that when the testing of all pairs has taken place, then all antenna elements have been tested.

Note that performing just one of the cross element gain measurements will yield useful information. By checking whether the cross element gain measurement falls within a predetermined window, it will provide an indication of the health of the antenna element. However, that window could be very large due to the variability of the cross coupling of the elements over frequency. Performing the cross element gain measurement for both antenna elements obviously provides considerably more useful information since it provides a measure of the symmetry for the two elements. It also checks that the transmitters on both sides are operating within an expected range.

Figure 3A:
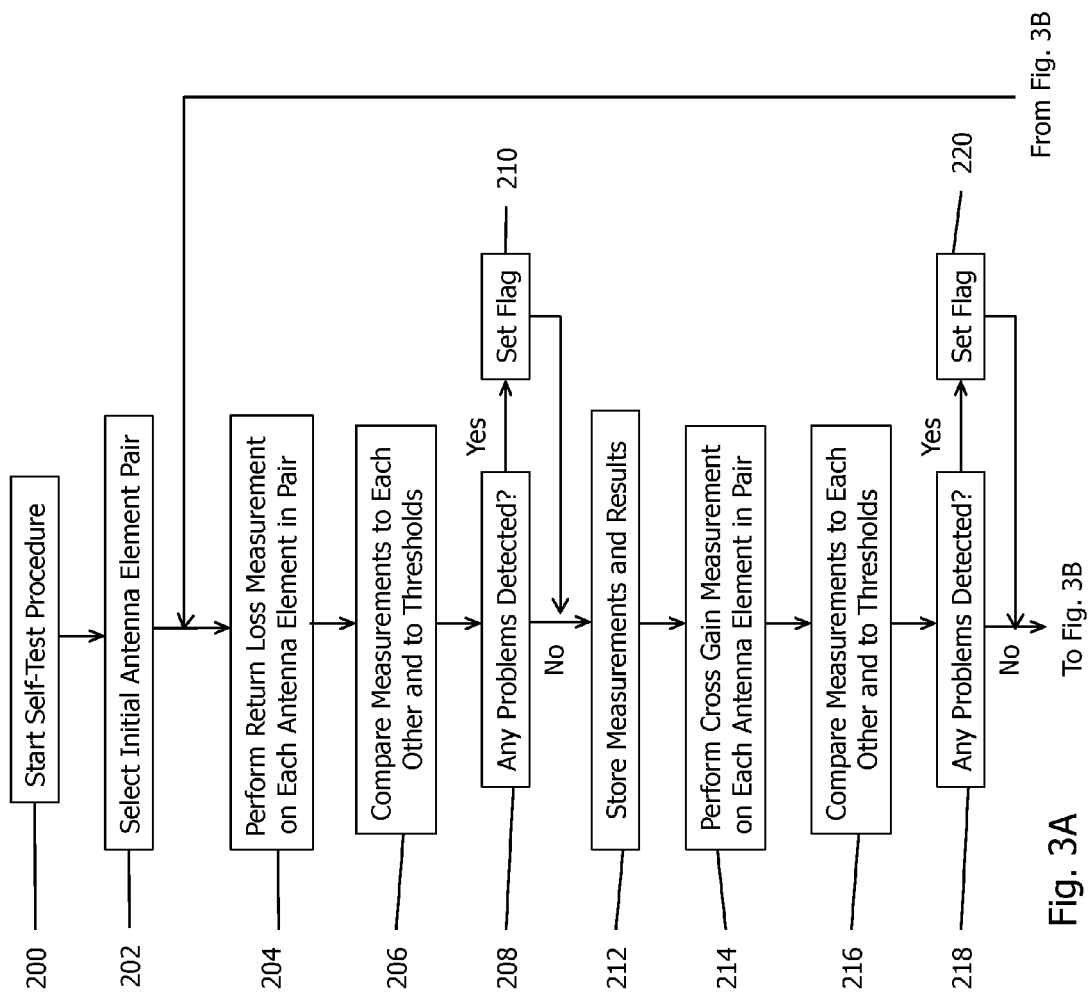
FIGS. 3A and 3B show an automated procedure that is implemented by the phased array antenna system for testing the antenna elements within the array.
Figure 3B:
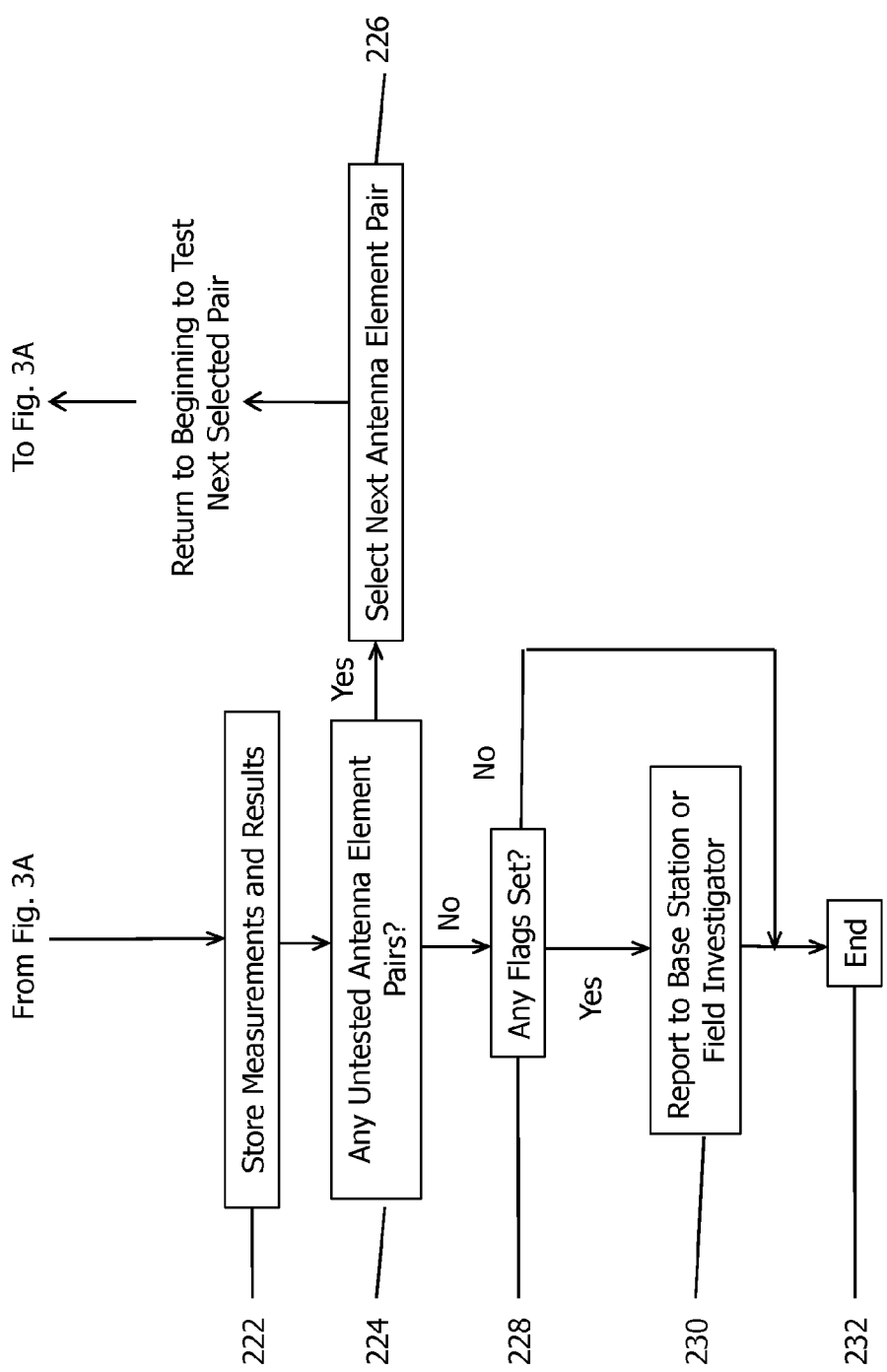

In a phased array antenna system that incorporates the above-described hardware as well as control software, the antenna element tests are performed in accordance with the procedure depicted in FIGS. 3A-B. The procedure is automatically initiated in some way, e.g. on a periodic, prescheduled basis, or in response to a detected change in performance, or in response to a command supplied by either a field maintenance person or by the base station (step 200). The procedure involves proceeding through the phased array and testing antenna element pairs until all of them have been tested. In a phased array that employs cross-polarized antenna elements, the pairs are naturally defined as the two elements within the cross-polarized antenna element.

At the start of the procedure, the system selects an initial antenna element pair (step 202) and performs a return loss measurement on each antenna element in that selected pair (step 204). The system then compares the two measurements to each other to determine whether there is any imbalance and compares each measurement to a preselected threshold established for identifying problems with either or both of the antenna elements (step 206). If any problems are detected, the system sets one or more flags for which element was identified as having a potential problem (steps 208 and 210). After setting the flags identifying a detected problem in step 210, or if no problem was detected in step 208, the system stores the measurements and the results in local memory (step 212).

Next, the system performs a cross element gain measurement on each antenna element in that selected pair (step 214). The system then compares the two measurements to each other to determine whether there is any imbalance and compares each measurement to a preselected threshold established for identifying problems with either or both of the antenna elements (step 216). If any problems are detected, the system sets one or more flags for which element was identified as having a potential problem (steps 218 and 220). After setting the flags identifying a detected problem in step 220, or if no problem was detected in step 218, the system stores the measurements and the results in local memory (step 222).

After completing all tests for the selected pair of antenna elements, the system determines whether there remain any untested pairs (step 224). If there are pairs that have not been tested, the system performs that same set of operations for the next untested pair (step 226).

After all antenna element pairs have been tested, the system determines whether any flags have been set for any of the tested antenna elements (228). If any flags have been set, the system reports that information to the base station or the field investigator (step 230). After a report has been sent indicating that one or more antenna elements has a problem, or if no flags have been set, indicating that the antenna elements in the array are working properly, the system ends the test sequence (step 232).

In this example the return loss measurements are performed first followed by the cross element gain measurements. But that need not be the case; other measurement and testing sequences are possible and may even be desirable. For example, the order can be reversed. That is, the cross gain measurements on the pair can be done first, followed by the return loss measurements. Or they can be performed together. When the return loss measurement is being performed on one antenna element, the cross gain measurement for the other element can also be performed. Similarly, there is no overriding need to compare the measurements and test for problems in the order in which they are shown in FIGS. 3A-B. The measurement data can be collected from all of the tests on the two elements first, and then the comparisons, tests against thresholds, and detection of problems can be performed at the end of that sequence before moving on to the net antenna element pair. Or alternatively, all of the comparisons, tests against thresholds, and detection of problems can be performed after all antenna element pairs in the array have been tested. A primary consideration is that all element pairs of interest are tested by the procedure. "All element pairs interest" may include the entire array or a subset of the array.

The program code that operates the matrix switches, the RF power detector, and the RF pilot signal source and that performs the steps described above is stored in memory 27. The memory, the µProcessor, the switches matrices, the RF power detector can be implemented centrally or can be implemented in a distributed manner (e.g. local to the antenna elements being tested).

Power measurements can be made with either an RF power measuring module (integrated circuit) or a discrete-type circuit. Much of the circuitry for doing this is conventional and readily available. The particular approach that is used will depend on the accuracy required and the board space available.

The above-described testing method can be performed as a self-test during start up on discrete pairs of elements in a round-robin fashion. It can also be extended to in-operation testing and to multiple simultaneous element testing utilizing multiple discrete frequency CW test tones, or spread spectrum PN-sequence test tones.

If the elements are tested in pairs in a round-robin fashion, then a single fixed and common frequency CW test tone can be used for all element tests. In order to test during operation, the elements would need to be disconnected temporarily from operating in order to be tested. In order to test or calibrate an element without disabling the operating signal, a spread tone (DSSS) type-signal could be used which can be transmitted at a very low signal level as compared with the signal being transmitted due to the DSSS processing gain.

FIGS. 4-7 and the following description provide details of an exemplary active phased array system in which the above-described test procedures and components can be incorporated. It should be understood that the figures illustrate just one example of many different possible ways of implementing an active antenna array system including analog implementations as well as digital implementations.

Figure 4:
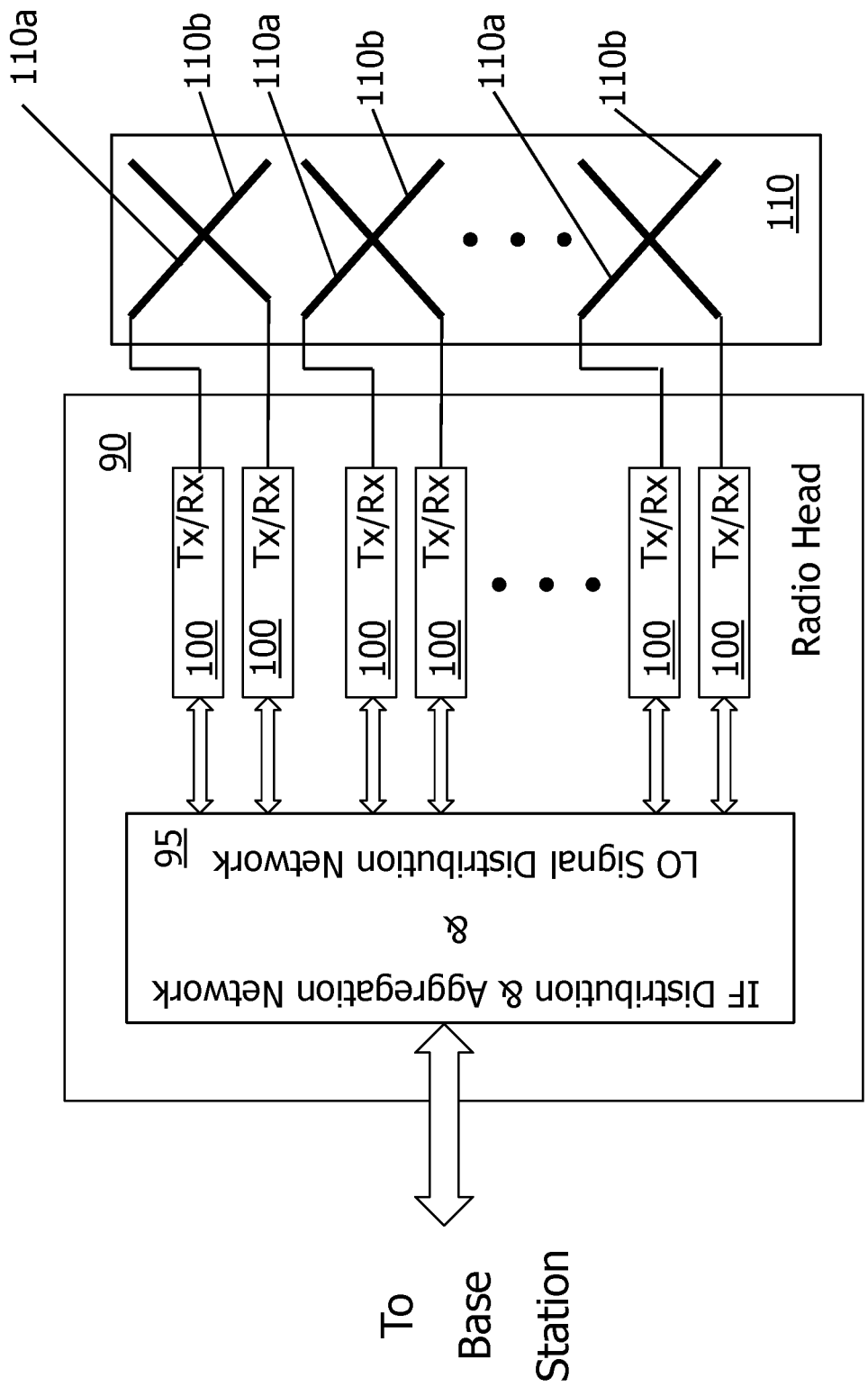
FIG. 4 is an exemplary high-level block diagram showing the internal structure of an exemplary radio head and phased array antenna.

Referring to FIG. 4, the phased array antenna 110 includes an array of M ±45° cross-polarized antenna element pairs, each antenna element pair including a −45° oriented antenna element 110a for generating a −45° polarized transmit beam and a +45° oriented antenna element 110b for generating a +45° polarized transmit beam. The radio head 90 includes multiple front-end modules (Tx/Rx modules) 100, equal in number to the number of antenna elements in the array, namely, 2M. There are two Tx/Rx modules 100 for each ±45° antenna element pair, one Tx/Rx module 100 connected to the −45° oriented antenna element 110b and the other Tx/Rx module 100 connected to the +45° oriented antenna element 110a. There is also a signal distribution network 95 that includes an IF distribution and aggregation network and an LO signal distribution network. This signal distribution network 95 delivers transmit signals from the base station to the Tx/Rx modules 100, delvers received signals from the Tx/Rx modules 100 to the base station, and provides coherent local oscillator signals to the Tx/Rx modules 100 for up-converting IF transmit signals to RF transmit signals and for down-converting RF received signals to IF received signals.

Figure 5:
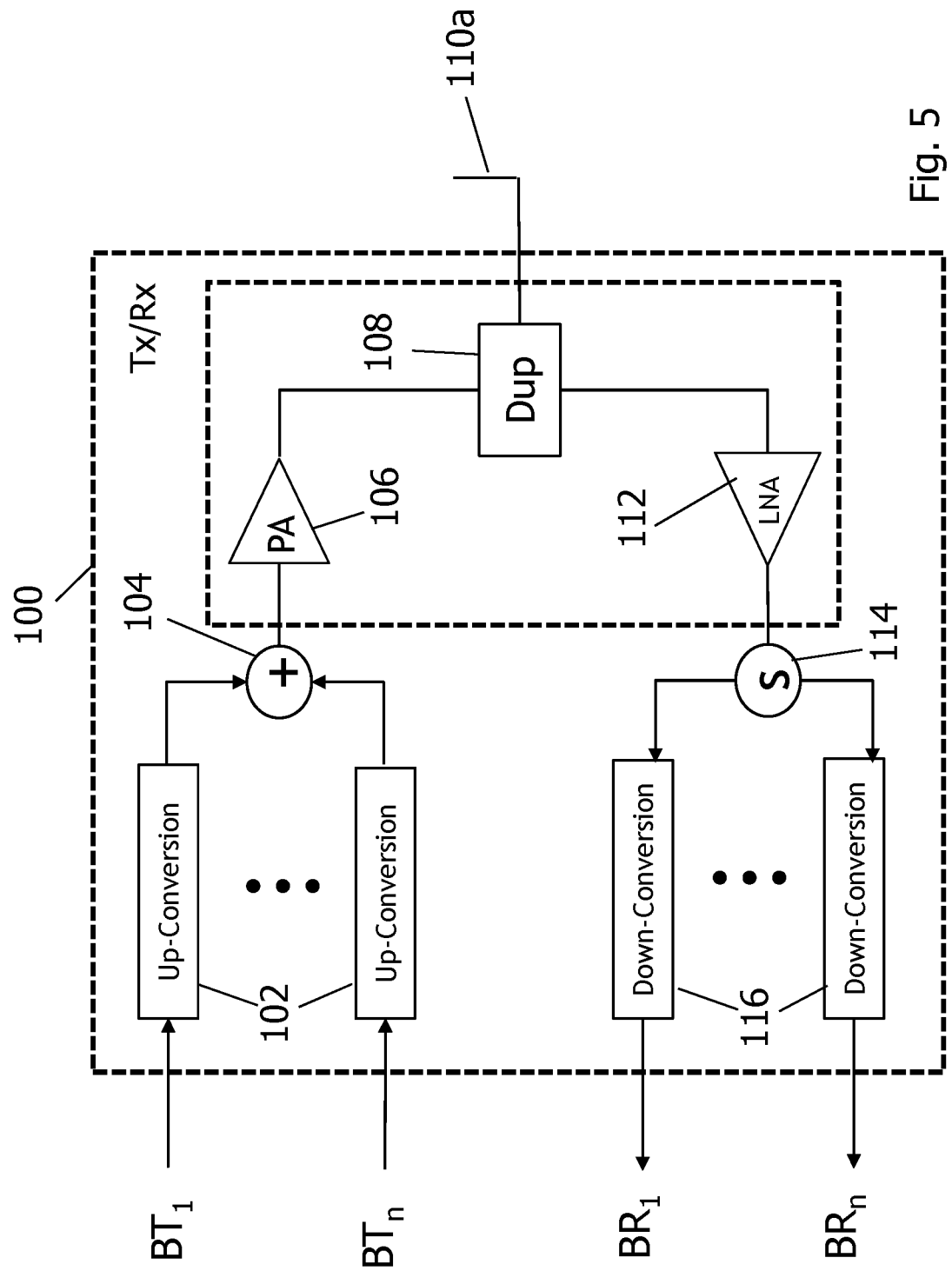
FIG. 5 is an exemplary high-level block diagram of a Tx/Rx module such as is shown in FIG. 4.

FIG. 5 is a block diagram of the front-end or Tx/Rx module 100 that connects to a single −45° oriented antenna element 110a of the multi-element antenna array. It includes a transmitter side and a receiver side. The transmitter side includes N up-conversion modules 102, a combiner circuit 104 (e.g. a Wilkinson type combiner), and a power amplifier (PA) 106. The receiver side includes a low noise amplifier (LNA) 112, a splitter 114 (e.g. a Wilkinson type splitter), and N down-conversion modules 116. The front-end module 100 also includes a duplexer circuit 108 that couples the transmit signal from the PA 106 on the transmitter side to the antenna element 110a and couples a received signal from the antenna element 110a to the LNA 112 on the receiver side. The input of each up-conversion module 102 is for receiving a different beam transmit signal stream $BT_1 \ldots BT_n$ from the baseband unit (not shown). And the output of each down-conversion module 116 is for outputting a different beam received signal stream $BR_1 \ldots BR_n$. Typically, each beam transmit signal stream is mapped to a different beam that is generated by the active antenna array system and each received signal stream corresponds to the signal received by a different receive beam formed by the active antenna array.

The phased array antenna system of FIG. 4 that employs the Tx/Rx module 100 is capable of generating N +45° polarized beams and N −45° polarized beams, each of which can carry a different transmit signal.

Figure 6:
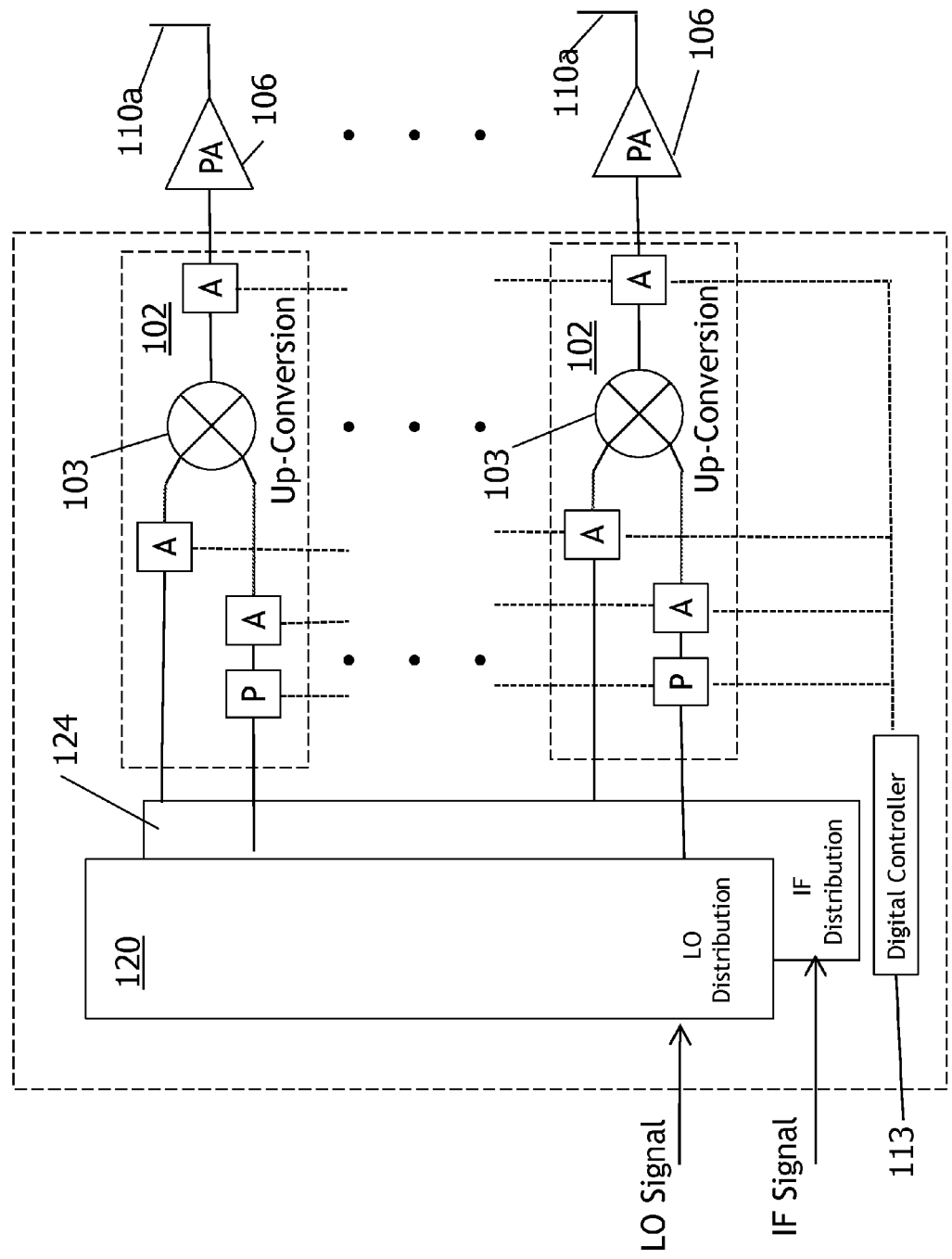
FIG. 6 is an exemplary block diagram of the transmitter side of an active antenna array system showing the circuitry for only one of multiple transmit beams.
Figure 7:
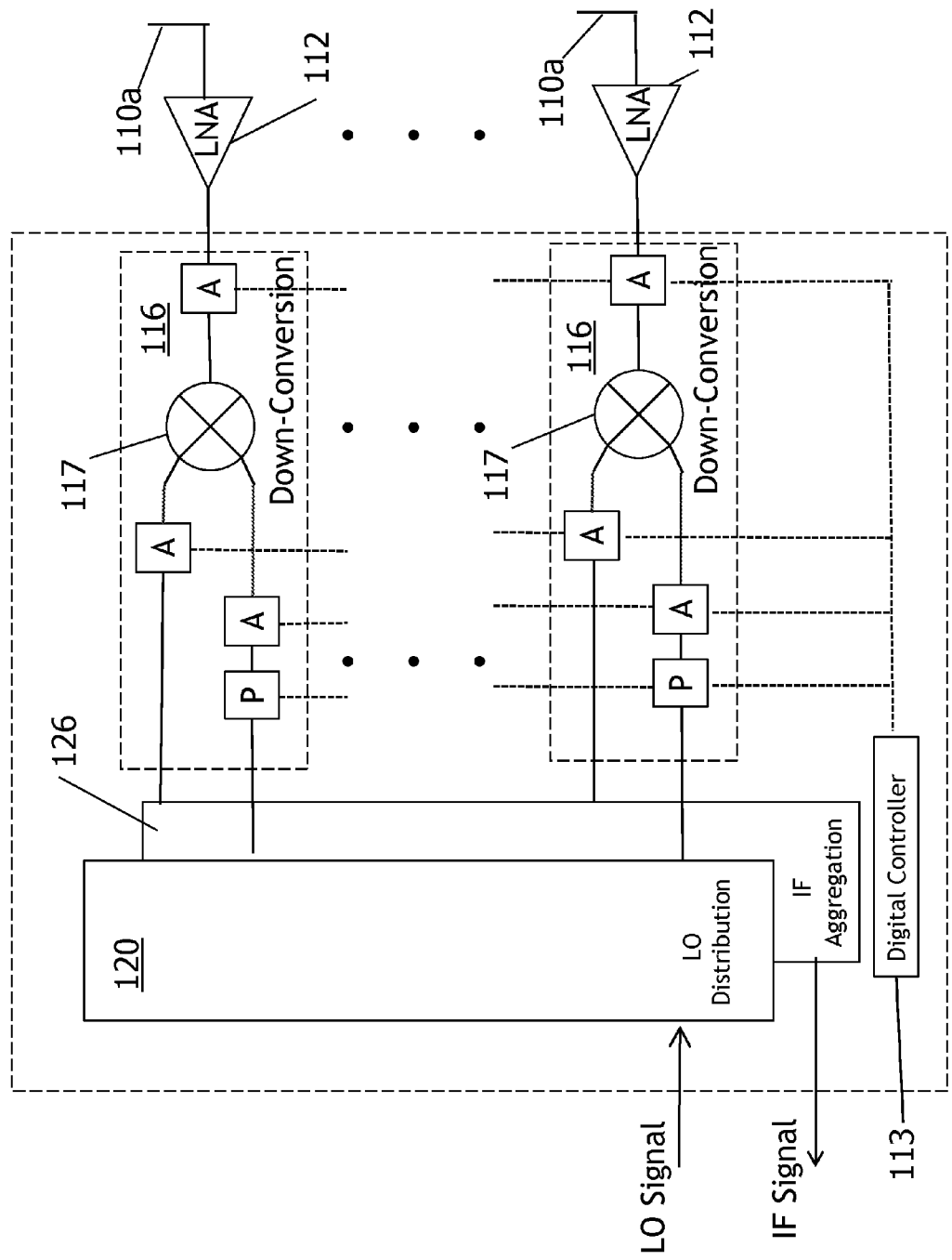
FIG. 7 is an exemplary block diagram of the receiver side of an active antenna array system showing the circuitry for only one of multiple receive beams.

An active antenna array system in which the up-conversion modules 102 on the transmitter side are shown in greater detail is depicted in FIG. 6; and an active antenna array system in which the down-conversion modules 116 on the receiver side are shown in greater detail is depicted in FIG. 7. These transmitter side system and the receiver side system are shown separately in FIGS. 6 and 7 to simplify the figures. But as should be apparent from FIG. 5, both transmitter side and receiver side systems are present in the front-end. Also, it should be noted that for simplicity FIG. 6 only shows one up-conversion module 102 and no combiner 104 (see FIG. 5) for each antenna element that is depicted. As should be apparent from FIG. 5, in the complete system there are multiple up-conversion modules 102 and a combiner 104 for each antenna element and there are multiple down-conversion modules 116 and a splitter 114 for each antenna element.

The active antenna array system of FIG. 5 is for transmitting a signal stream over a single transmit beam that is generated by the M −45° oriented antenna elements 110a of the antenna array (where M is an integer that is greater 1).

Referring to FIGS. 6 and 7, there is an LO distribution network 120 for distributing a coherent or phase-synchronized LO signal to the M up-conversion modules 102 and the M down-conversion modules 116. As shown in FIG. 6, there is also an IF distribution network 124 for delivering the IF transmit signal to each of the up-conversion modules 102. And as shown in FIG. 7, there is an IF aggregation network 126 for aggregating the received signals from each of the down-conversion modules 116.

The distribution and aggregation networks may be passive linear reciprocal networks with electrically identical paths to ensure the coherent distribution/aggregation of signals. Alternatively, one or more of these networks may be implemented using the bidirectional signaling network described in U.S. Pat. No. 8,259,884, entitled "Method and System for Multi-Point Signal Generation with Phase Synchronized Local Carriers," filed Jul. 21, 2008 and U.S. Pat. No. 8,611,959, entitled "Low Cost, Active Antenna Arrays," filed Jun. 30, 2011 or the serial interconnection approach described in U.S. Ser. No. 15/259,639, entitled "Calibrating a Serial Interconnection," filed Sep. 8, 2016, the contents of all of which are incorporated herein by reference.

Each up-conversion module 102 includes a mixer 103 and various amplitude and phase setting circuits identified by A and P, respectively. The LO signal and the distributed IF transmit signal stream are both provided to the mixer 103 which up-converts the IF transmit signal stream to an RF transmit signal stream that is provided to the power amplifier 106. Similarly, each down-conversion module 116 also includes a mixer 117 and various amplitude and phase setting circuits similarly identified by A and P, respectively. The mixer 117 in the down-conversion module 116 multiplies the LO signal provided by the LO distribution network 120 and the received RF signal stream from the low noise amplifier 112 that is coupled to the antenna element 110a to generate a down-converted IF received signal stream. The down-converted IF signal stream is provided to the IF aggregation network 126 for aggregation with the IF received signal streams from the other antenna elements and for delivery back to the base station.

The amplitude and phase setting circuits A and P are used for changing the relative phase or amplitude of individual antenna signals to thereby establish the size, direction, and intensity of the transmit and receive beam patterns that are generated by the antenna array. (Note: In an antenna array, a transmit beam is a radiation pattern that is generated by the antenna array. That radiation pattern can be measured in front of the antenna array. In contrast, a receive beam is not a radiation pattern formed by the antenna array but rather is a pattern of antenna sensitivity. Nevertheless, in spite of this difference, they are both generally referred to as beams.) The amplitude setting circuit is basically equivalent to a variable gain amplifier, in which the ratio of the output signal amplitude to the input signal amplitude is programmable and is set by electronic control. The phase setting circuit has the fundamental capability of shifting the input signal in phase (or time) under electronic control. These amplitude and phase setting circuits are controlled by digital control signals supplied by a separate control processor 113.

The typology of the amplitude setting and phase setting circuits shown in FIGS. 6 and 7 is just one of many possibilities for giving the basic transmitter and receiver the capability to control independently the amplitude and phase values of the individual antenna signals. The number and placement of the amplitude and phase setting circuits can vary from what is illustrated in FIGS. 6 and 7 and depends on the implementation approach that is employed. In addition, there are other components which might be present in the up-conversion and down-conversion modules but which are not shown in the figures because they are well known to persons skilled in the art. These might include, for example, channel IF filters and automatic gain controls.

Other embodiments are within the scope of the following claims. For example, poor return loss may also be detectable through an array calibration process, such as is described in U.S. Ser. No. 62/216,592, filed Sep. 10, 2015, entitled "Methods for Active Array Calibration," and incorporated herein by reference in its entirety. In other words, it is possible that some problems with the radiating elements and the connections thereto can also be detected by simply examining the ranges of phase and gain within the calibration data for the array. In that case, the testing of calibration data can be combined with the cross element gain measurement tests to perform a complete test of the array.

The RF power detector circuitry mentioned above is standard RF circuitry of which there are many different types available. Though it should be understood that the return loss measurement can be performed in ways other than by using an RF power detector. For example, one could use a time delay reflectometer (TDR), which is basically just another circuit implementation for measuring return loss (or VSWR).

If CW tones are used, then the elements being tested need to be taken out of service. If DSSS (direct sequence spread spectrum) is used, the elements can be tested while in operation because the signal level of the DSSS signal can be extremely small to the spread spectrum recovery processing gain.

If the system is FDD (Frequency Division Duplex), then the Tx return loss and Tx cross element gain test can be done at a frequency in the Tx band and the Rx return loss can be done using a frequency in the Rx band, though that may not be necessary. If the system is TDD (Time Division Duplex), the Tx and Rx bands are the same, so using one frequency would suffice.

What is claimed is:

1. A method of testing a phased array antenna that includes a plurality of antenna element pairs, each antenna element pair of the plurality of antenna element pairs including a first antenna element and a second antenna element, said method comprising:
for each antenna element pair of the plurality of antenna element pairs, performing a first cross element gain measurement from the first antenna element to the second antenna element of that antenna element pair; and
determining whether there is a problem associated with the phased array antenna by examining the first cross element gain measurements for the plurality of antenna element pairs.

2. The method of claim 1, further comprising:
for each antenna element pair of the plurality of antenna element pairs,
performing a second cross element gain measurement from the second antenna element to the first antenna element of that antenna element pair,
wherein determining whether there is a problem associated with the phased array antenna also involves examining the second cross element gain measurements for the plurality of antenna element pairs.

3. The method of claim 2, wherein determining whether there is a problem associated with the phased array antenna also involves, for each antenna element pair among the plurality of antenna element pairs, comparing the first and second cross element gain measurements for that antenna element pair.

4. The method of claim 2, further comprising:
for each antenna element pair of the plurality of antenna element pairs,
performing a first return loss measurement for the first antenna element of that antenna element pair and performing a second return loss measurement for the second antenna element of that antenna element pair,
wherein determining whether there is a problem associated with the phased array antenna also involves examining the first and second return loss measurements for the plurality of antenna element pairs.

5. The method of claim 2, wherein, for each antenna element pair of the plurality of antenna element pairs, performing the first cross element gain measurement from the first antenna element to the second antenna element of that antenna element pair comprises measuring the power of a signal sent to the first antenna element of that antenna element pair and measuring the power received by the second antenna element of that antenna element pair.

6. The method of claim 2, wherein within each antenna element pair among the plurality of antenna element pairs the first and second antenna elements of that pair are orthogonally oriented with respect to each other.

7. The method of claim 6, wherein within each antenna element pair among the plurality of antenna element pairs the first and second antenna elements of that pair are cross-polarized (±45°) pairs.

8. The method of claim 6, wherein within each antenna element pair among the plurality of antenna element pairs the first and second antenna elements of that pair are H—V polarized pairs.

9. An apparatus system comprising:
a phased array antenna comprising an array of antenna elements, the array of antenna elements forming a plurality of antenna element pairs, each antenna element pair of the plurality of antenna element pairs including a first antenna element and a second antenna element;
a plurality of transmitter circuits, each transmitter circuit of the plurality of transmitter circuits connected to a different corresponding one of the antenna elements within the array of antenna elements;
for each transmitter circuit among the plurality of transmitter circuits, a bidirectional coupler connected between that transmitter circuit and the antenna element to which that transmitter circuit is connected;
a detector system for measuring a signal characteristic;
a switching system for selectively connecting signals from the bidirectional couplers for the plurality of transmitter circuits to the detector system; and
a processor system programmed to use the switching system and the detector system to perform the operations of:
for each antenna element pair of the plurality of antenna element pairs, performing a first cross element gain measurement from the first antenna element to the second antenna element of that antenna element pair; and
determining whether there is a problem associated with the phased array antenna by examining the first cross element gain measurements for the plurality of antenna element pairs.

10. The apparatus of claim 9, wherein the processor system is further programmed to use the switching system and the detector system to perform the operations of:
for each antenna element pair of the plurality of antenna element pairs,
performing a second cross element gain measurement from the second antenna element to the first antenna element of that antenna element pair; and
determining whether there is a problem associated with the phased array antenna by also examining the second cross element gain measurements for the plurality of antenna element pairs.

11. The apparatus of claim 10, wherein the processor system is further programmed to determine whether there is a problem associated with the phased array antenna by also, for each antenna element pair among the plurality of antenna element pairs, comparing the first and second cross element gain measurements for that antenna element pair.

12. The apparatus of claim 10, wherein the processor system is further programmed to use the switching system and the detector system to perform the operations of:
for each antenna element pair of the plurality of antenna element pairs,
performing a first return loss measurement for the first antenna element of that antenna element pair and performing a second return loss measurement for the second antenna element of that antenna element pair, and
determining whether there is a problem associated with the phased array antenna by also examining the first and second return loss measurements for the plurality of antenna element pairs.

13. The apparatus of claim 9, wherein within each antenna element pair among the plurality of antenna element pairs, the first and second antenna elements of that pair are orthogonally oriented with respect to each other.

14. The apparatus of claim 13, wherein within each antenna element pair among the plurality of antenna element pairs, the first and second antenna elements of that pair form a cross-polarized)(±45°) pair.

15. The apparatus of claim 13, wherein within each antenna element pair among the plurality of antenna element pairs, the first and second antenna elements of that pair form a H—V polarized pair.

16. The apparatus of claim 10, further comprising:
an RF pilot signal source;
for each transmitter circuit among the plurality of transmitter circuits, a directional coupler connected to supply a signal to that transmitter circuit; and
a second switching system for selectively connecting signals from the RF pilot signal source to the directional couplers for the plurality of transmitter circuits, and
wherein the processor system is further programmed to also use the RF pilot signal source and the second switching system to perform the operations of: for each antenna element pair of the plurality of antenna element pairs, performing the first cross element gain measurement from the first antenna element to the second antenna element of that antenna element pair and performing the second cross element gain measurement from the second antenna element to the first antenna element of that antenna element pair.

17. The apparatus of claim 16, wherein the processor system is further programmed to also use the RF pilot signal source and the second switching system to perform the operations of:
for each antenna element pair of the plurality of antenna element pairs, performing a first return loss measurement for the first antenna element of that antenna element pair and performing a second return loss measurement for the second antenna element of that antenna element pair.

* * * * *